April 7, 1970    R. R. JOHNSON    3,504,485
COVER BLADE FOR ROTARY MOWER
Filed June 28, 1968
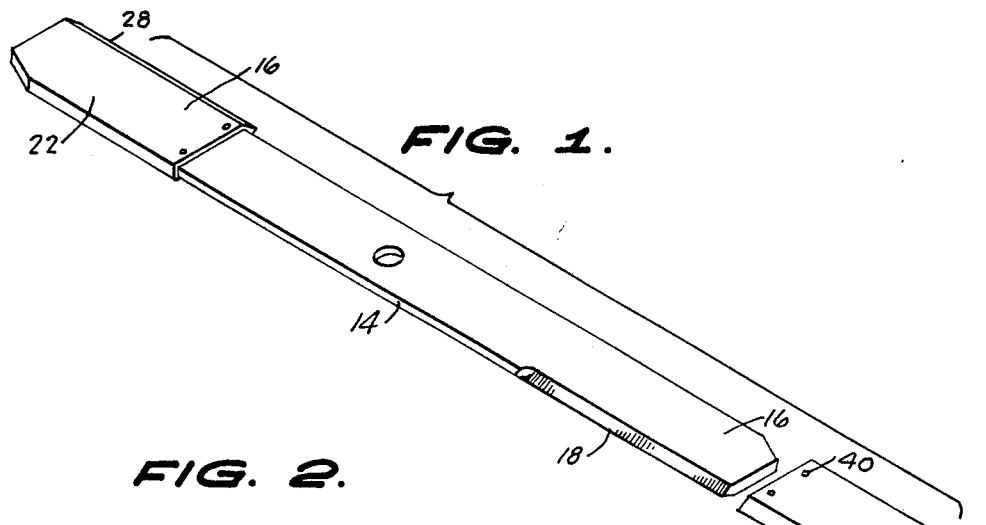
FIG. 1.
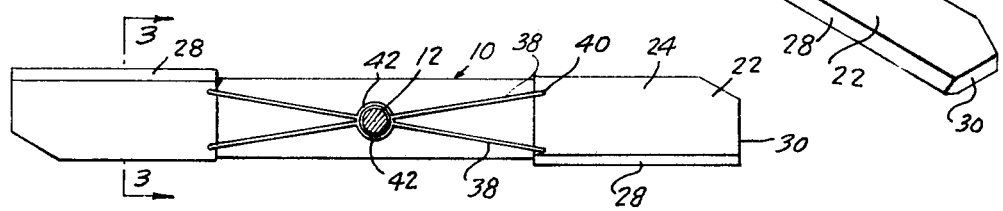
FIG. 2.
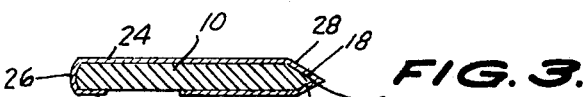
FIG. 3.
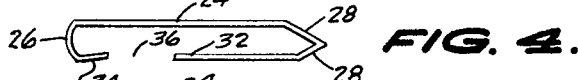
FIG. 4.
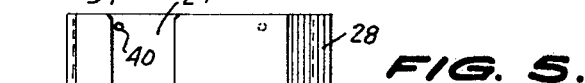
FIG. 5.
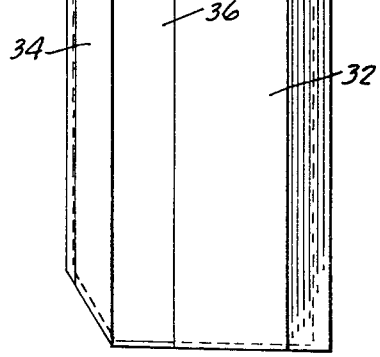
INVENTOR.
RALPH R. JOHNSON,
BY
Berman, Davidson & Berman
ATTORNEYS.

United States Patent Office 3,504,485
Patented Apr. 7, 1970

3,504,485
COVER BLADE FOR ROTARY MOWER
Ralph R. Johnson, Box 246, Ashland, Oreg. 97520
Filed June 28, 1968, Ser. No. 741,121
Int. Cl. A01d 55/18
U.S. Cl. 56—295      4 Claims

ABSTRACT OF THE DISCLOSURE

Apparatus for sliding onto a rotary mower cutting blade comprising a cover blade made in the form of a slip-on sleeve cover, and having the configuration of the cutting portion of the rotary mower cutting blade, with means to hold the slip-on sleeve cover on the ends of the rotary mower blade so as to produce a sharp cutting edge without requiring dismantling of the rotary blade from the mower for sharpening.

---

The present invention relates to a blade for a rotary type power mower and the like, such as those used for cutting lawns. Such mowers require the cutting edge of the blade to be dismantled from its drive shaft and to be sharpened from time to time. This is due to the fact that the blade, when used for cutting lawns, is subject to chipping, nicking and parts of the blade breaking when it hits foreign objects, such as stones, sticks and the like, as the grass is being cut.

It is an object of the present invention to provide an economical and easy device for providing a new and sharp cutting edge for the blade of a rotary power lawn mower.

It is an object of the present invention to provide a cover blade which is made to slide onto or over the end of the original cutting blade of any present-day rotary type power lawn mower that is used.

Another object of the present invention is to provide a blade made in the form of a slip-on sleeve cover which will cling to the outer end part of the original rotary power mower blade, and which further serves the purpose of being easily installed and presharpened so that it can be easily installed by a person without any mechanical skill.

A further object of the present invention is to provide a cover blade that can easily be slid onto an existing cutter blade for a rotary power mower by merely exposing the underside of the power mower to the user and making available the portion of the original cutting blade so that the cover blade may be installed by the slip cover method.

A further object of the present invention is to provide one slip cover blade which fits over and onto the opposite ends of the original rotary power mower cutting blade, which cover blades are identical and made identical to each other and so can be used interchangeably on either end of the original blade.

It is another object of the present invention to provide identical cover blades which can be easily slipped onto the opposite ends of the original cutter blade, and consequently reduce the cost of manufacture thereof, and maintains the cost to a minimum.

Another object of the present invention is to provide identical cover blades for opposite ends of the original cutter blade of the power mower so that after the original set of cover blades for a power mower blade is purchased, it may be necessary to purchase only one blade at each subesquent purchase if only one of the cover blades is nicked or chipped.

Yet another object of the present invention is to provide a cover blade which is so constructed that it can clamp over the outer ends of the original blade, and which cover blade is further secured or prevented from slipping off or being thrown off the rotary mower cutter blade by centrifugal force by wire means secured to each blade at the inner end of each cover blade.

Yet another object of the present invention is to provide cover blades for slipping over the ends of the original rotary mower cutter blade, which is constructed of a thin metal capable of holding its shape and position during its intended use, and with its leading or cutting edge so constructed so as to give many hours of serviceable life and especially serviceable use as a sharp cutting edge.

Still a further object of the present invention is to provide cover blades for the original blades which prevent damage to the original blade, so that the original blade will not require filing or grinding thereof so that the rotary blade will never be out of balance and put any undue vibration or wear on the motor bearings.

Various other objects and advantages of the present invention will be readily apparent from the following detailed description when considered in connection with the accompanying drawings forming a part thereof, and in which:

FIGURE 1 is a perspective exploded view of the cover blade device emboding the present invention;

FIGURE 2 is a top plan view of the cover blade for the rotary mower original blade with the wire securing means affixed thereto;

FIGURE 3 is an enlarged section taken along the lines 3—3 of FIGURE 2;

FIGURE 4 is a view similar to FIGURE 3 illustrating the configuration of the cover blade itself; and FIGURE 5 is a bottom view of the cover blade shown in FIGURE 4.

Referring to the drawings, the reference numeral 10 generally designates a cutter blade for a power mower which is secured to a drive shaft 12 for rotation by the drive shaft when the power mover, not shown, is actuated. The cutter blade 10 comprises a central portion 14 and end portions 16. The central portion 14 is rectangular in configuration and has vertical side edges, while the opposite end portions 16 are provided with beveled leading edges or cutter edges 18, with the cutter edges 18 being disposed on the opposite sides or faces of the cutter blade.

Referring to FIGURE 3, the best view of the cutter edges or the beveled edges 18 is shown therein, and in which it will be noted that the top and lower faces of the cutter edges are beveled toward one another so that the cutter edges 18 are sharpened to a cutter edge as indicated by the apex 19.

Referring to FIGURE 1, the outer or end portions 16 of the blade are provided with cover blades 22 with one cover blade 22, as seen in FIGURE 1, being disposed over one end portion 16 of the original cutter blade while the other cover blade 22 on the other end is shown before it is disposed over its respective end portion 16.

It will be noted that the cover blades 22 are identical in configuration and are provided with a flat top portion 24 and a rear wall 26 and a front wall 28 having the same configuration as the cutter edges 18 of the cutter blade 10. The outer end of the cover blade 22 is closed by an end wall 30. The cutter blade 22 is provided with a front bottom wall 32 of substantially flat configuration and a bottom rear wall 34 of substantially flat configuration, which walls both hug the underside or the undersurface of the cutter blade 10, as best seen in FIGURE 3. It will be noted that the front and rear bottom walls 32 and 34, respectively, are spaced apart so that a gap 36 is provided between them.

The cover blades are slid over the respective end portions 16 of the blade and after they are disposed in the position shown in FIGURE 2, diagonally extending wire members 38 have their opposite ends inserted into small drilled holes 40 adjacent the inner edges of the cover blades 22. The diagonal wires 38 have a semicircular portion 42 in the central portion thereof, so that they will extend around the shaft 12 and maintain the cover blades on the end portions 16 of the cutter blade 10.

The cover blade is made of thin metal and has a configuration substantially the same as the outer surface of the end portions 16 of the cutter blade 10, so that they are readily slidable over the cutter blade 10 and cover the blade, and the hollow cross-section of the cover blades conforms to the outer shape of the blade so that the cover blades are reinforced by the solid cross-section of the cutter blade 10.

Thus, from the foregoing description, it is apparent that the present invention provides a novel cover blade which is easily slid over the ends of the original cutter blade of a rotary power mower, and which can be readily replaced so that there is no requirement for dismantling of the power mower for sharpening of the original blade. The configuration of the cover blades also provides a hard and sharp cutting surface and reduces the cost and maintenance of a power mower.

Inasmuch as various changes may be made in the form, location and relative arrangement of the several parts without departing from the essential characteristics of the invention, it is to be understood that this invention is not to be limited except by the scope of the appended claims.

What is claimed is:

1. A cover blade for a lawn mower cutter blade of the rotary type having a vertical driven shaft to which it is attached at its midpoint comprising a pair of sleeve covers of identical configuration having a closed vertical outer end and an open inner end for sliding over the ends of a mower cutter blade, said sleeve covers having a completely closed top wall and a bottom wall consisting of a front and rear elongated portion with an elongated gap extending the entire length therebetween to permit said cover to fit blades of varying tolerances, said covers having a beveled side edge forming a cutting edge and a vertical side edge, said top, bottom and side edges and closed outer end conforming to the outer surface of a cutter blade.

2. The cover blade of claim 1 wherein wire means are provided for holding said sleeve covers on their respective end portions.

3. The cover blade of claim 1 wherein said wire means are diagonally extending wires secured at their opposite ends to the sleeve covers disposed on said end portions.

4. The cover blade of claim 1 wherein said wires have semicircular portions in their central portions for fitting around the shaft of the power mower.

References Cited

UNITED STATES PATENTS

| 2,706,441 | 4/1955 | Caldwell et al. | 56—295 |
| 2,863,162 | 12/1958 | Draughon | 56—295 X |
| 3,015,929 | 1/1962 | Bright | 56—295 X |
| 3,327,460 | 6/1967 | Blackstone | 56—295 |

ANTONIO F. GUIDA, Primary Examiner

U.S. Cl. X.R.

56—295